United States Patent
Wang et al.

(10) Patent No.: US 10,798,609 B2
(45) Date of Patent: Oct. 6, 2020

(54) METHODS, SYSTEMS, AND COMPUTER READABLE MEDIA FOR LOCK-FREE COMMUNICATIONS PROCESSING AT A NETWORK NODE

(71) Applicant: Oracle International Corporation, Redwood Shores, CA (US)

(72) Inventors: Jinhong Wang, Nanjing (CN); Jingchao Shi, Nanjing (CN); Xiaobing Yu, Nanjing (CN)

(73) Assignee: Oracle International Corporation, Redwood Shores, CA (US)

( * ) Notice: Subject to any disclaimer, the term of this patent is extended or adjusted under 35 U.S.C. 154(b) by 22 days.

(21) Appl. No.: 16/162,112

(22) Filed: Oct. 16, 2018

(65) Prior Publication Data

US 2020/0120541 A1  Apr. 16, 2020

(51) Int. Cl.
| | |
|---|---|
| *H04W 28/08* | (2009.01) |
| *H04L 12/803* | (2013.01) |
| *H04L 12/863* | (2013.01) |
| *H04L 12/861* | (2013.01) |
| *H04L 29/08* | (2006.01) |

(Continued)

(52) U.S. Cl.
CPC .......... *H04W 28/08* (2013.01); *H04L 47/125* (2013.01); *H04L 47/627* (2013.01); *H04L 49/90* (2013.01); *H04L 67/146* (2013.01); *H04L 69/18* (2013.01); *H04W 4/08* (2013.01); *H04M 15/66* (2013.01)

(58) Field of Classification Search
CPC ..................................................... H04W 28/08
See application file for complete search history.

(56) References Cited

U.S. PATENT DOCUMENTS

| 7,406,524 B2 | 7/2008 | Sadot et al. |
| 7,633,969 B2 | 12/2009 | Caugherty et al. |

(Continued)

FOREIGN PATENT DOCUMENTS

| CN | 102624922 B | 8/2014 |
| CN | 104123190 A | 10/2014 |

OTHER PUBLICATIONS

Notice of Allowance and Fee(s) Due and Examiner-Initiated Interview Summary for U.S. Appl. No. 14/961,376 (dated Jan. 22, 2018).

(Continued)

*Primary Examiner* — Kodzovi Acolatse
*Assistant Examiner* — Abdeltif Ajid
(74) *Attorney, Agent, or Firm* — Jenkins, Wilson, Taylor & Hunt, P.A.

(57) ABSTRACT

Methods, systems, and computer readable media for lock-free communications processing at a network node are disclosed. One method occurs at a first network node configured to add messages to a plurality of queues, wherein each of the plurality of queues is accessed by one of a plurality of threads. The method comprises receiving a first message associated with a first mobile subscriber; determining that the first message is associated with a first partition key; assigning, based on the first partition key, the first message to a first queue of the plurality of queues, wherein the first queue includes messages associated with the first mobile subscriber and wherein the first queue is accessible by a first thread of the plurality of threads; and processing, by the first thread, messages of the first queue in a first in, first out order.

18 Claims, 5 Drawing Sheets

(51) Int. Cl.
  *H04L 29/06* (2006.01)
  *H04W 4/08* (2009.01)
  *H04M 15/00* (2006.01)

(56) References Cited

U.S. PATENT DOCUMENTS

| | | | |
|---|---|---|---|
| 7,844,973 B1* | 11/2010 | Dice | G06F 9/52 |
| | | | 707/799 |
| 7,882,168 B2 | 2/2011 | Yanagihara et al. | |
| 8,284,205 B2 | 10/2012 | Miller et al. | |
| 8,484,656 B2 | 7/2013 | Raja et al. | |
| 8,566,928 B2 | 10/2013 | Dagon et al. | |
| 8,601,073 B2 | 12/2013 | Craig et al. | |
| 8,707,314 B2 | 4/2014 | Gummaraju et al. | |
| 8,776,207 B2 | 7/2014 | Mihelich et al. | |
| 8,782,645 B2 | 7/2014 | Breternitz et al. | |
| 9,332,053 B2 | 5/2016 | Sheer | |
| 9,979,656 B2 | 5/2018 | Peterson et al. | |
| 2009/0228446 A1 | 9/2009 | Anzai et al. | |
| 2011/0202660 A1 | 8/2011 | Pandya et al. | |
| 2012/0192200 A1 | 7/2012 | Rao et al. | |
| 2012/0224531 A1 | 9/2012 | Karuturi et al. | |
| 2012/0233486 A1 | 9/2012 | Phull et al. | |
| 2013/0094520 A1 | 4/2013 | Mann et al. | |
| 2013/0339978 A1 | 12/2013 | Sander | |
| 2014/0157337 A1 | 6/2014 | Gopalakrishnan et al. | |
| 2014/0304413 A1 | 10/2014 | Kondamuru et al. | |
| 2016/0191363 A1* | 6/2016 | Haraszti | H04L 67/2842 |
| | | | 709/223 |
| 2016/0373348 A1 | 12/2016 | Renzullo et al. | |
| 2017/0004015 A1* | 1/2017 | Raja | G06F 9/5072 |
| 2017/0163537 A1 | 6/2017 | Peterson et al. | |
| 2017/0318082 A1* | 11/2017 | Thakur | G06F 9/5027 |
| 2018/0336071 A1* | 11/2018 | Zaifman | H04L 69/22 |

OTHER PUBLICATIONS

"Traffix Signaling Delivery Controller Diameter Load Balancer: Scalability for your Control Plane," Traffix Systems, The Diameter Control Plane Experts, www.traffixsystems.com pp. 1-3 (2011).

Banikazemi et al., "Profile-Based Load Balancing for Heterogeneous Clusters," pp. 1-10 (Jul. 1998).

Notification of Transmittal of the International Search Report and the Written Opinion of the International Searching Authority, or the Declaration for International Application Serial No. PCT/US2019/053911 (dated Dec. 10, 2019).

* cited by examiner

METHODS, SYSTEMS, AND COMPUTER READABLE MEDIA FOR LOCK-FREE COMMUNICATIONS PROCESSING AT A NETWORK NODE

TECHNICAL FIELD

The subject matter described herein relates to network communications processing. More particularly, the subject matter described herein relates to methods, systems, and computer readable media for lock-free communications processing at a network node.

BACKGROUND

A network node may receive significant traffic from multiple users. For example, in a telecommunications network, a policy and charging rules function (PCRF) server may receive multiple, concurrent requests for policy rules associated with the same subscriber, e.g., via multiple interfaces and/or various network nodes. In this example, there is a high possibility that messages associated with the requests may be processed out of order and/or that dependent or related messages may be processed by different processors or nodes in parallel because there is generally no guarantee that a remote parties' network element will interact with a network element in a strictly defined sequence, e.g., as per 3GPP standards. When messages are processed out of order or when related messages are not processed by the same node or processor, issues can occur that interrupt services. For example, a race condition (e.g., a condition where timing involving a shared resource and/or multiple threads can yield an inaccurate result) could occur that prevents a subscriber from accessing the network or a related service. One way to mitigate traffic processing issues is to implement a lock mechanism per call flow such that messages in a given call flow wait until the lock for the call flow is available, thereby preventing at least some out of order processing events. However, lock-based mechanisms can increase memory (e.g., lock contention overhead) requirements and can also cause other issues (e.g., contentions, deadlocks, starvation, priority inversion, convoying, etc.) that can be difficult to diagnose and resolve.

SUMMARY

Methods, systems, and computer readable media for lock-free communications processing at a network node are disclosed. One method occurs at a first network node configured to add messages to a plurality of queues, wherein each of the plurality of queues is accessed by one of a plurality of threads. The method comprises receiving a first message associated with a first mobile subscriber; determining that the first message is associated with a first partition key; assigning, based on the first partition key, the first message to a first queue of the plurality of queues, wherein the first queue includes messages associated with the first mobile subscriber and wherein the first queue is accessible by a first thread of the plurality of threads; and processing, by the first thread, messages of the first queue in a first in, first out order.

One system includes a first network node. The first network node includes at least one processor and memory. The first network node is configured to add messages to a plurality of queues, wherein each of the plurality of queues is accessed by one of a plurality of threads. The first network node is further configured for: receiving a first message associated with a first mobile subscriber; determining that the first message is associated with a first partition key; assigning, based on the first partition key, the first message to a first queue of the plurality of queues, wherein the first queue includes messages associated with the first mobile subscriber and wherein the first queue is accessible by a first thread of the plurality of threads; and processing, by the first thread, messages of the first queue in a first in, first out order.

The subject matter described herein can be implemented in software in combination with hardware and/or firmware. For example, the subject matter described herein can be implemented in software executed by a processor. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term 'node' refers to at least one physical computing platform including one or more processors and memory.

As used herein, the terms 'function' or 'module' refer to software in combination with hardware and/or firmware for implementing features described herein.

BRIEF DESCRIPTION OF THE DRAWINGS

The subject matter described herein will now be explained with reference to the accompanying drawings of which.

DETAILED DESCRIPTION

Figure 1:
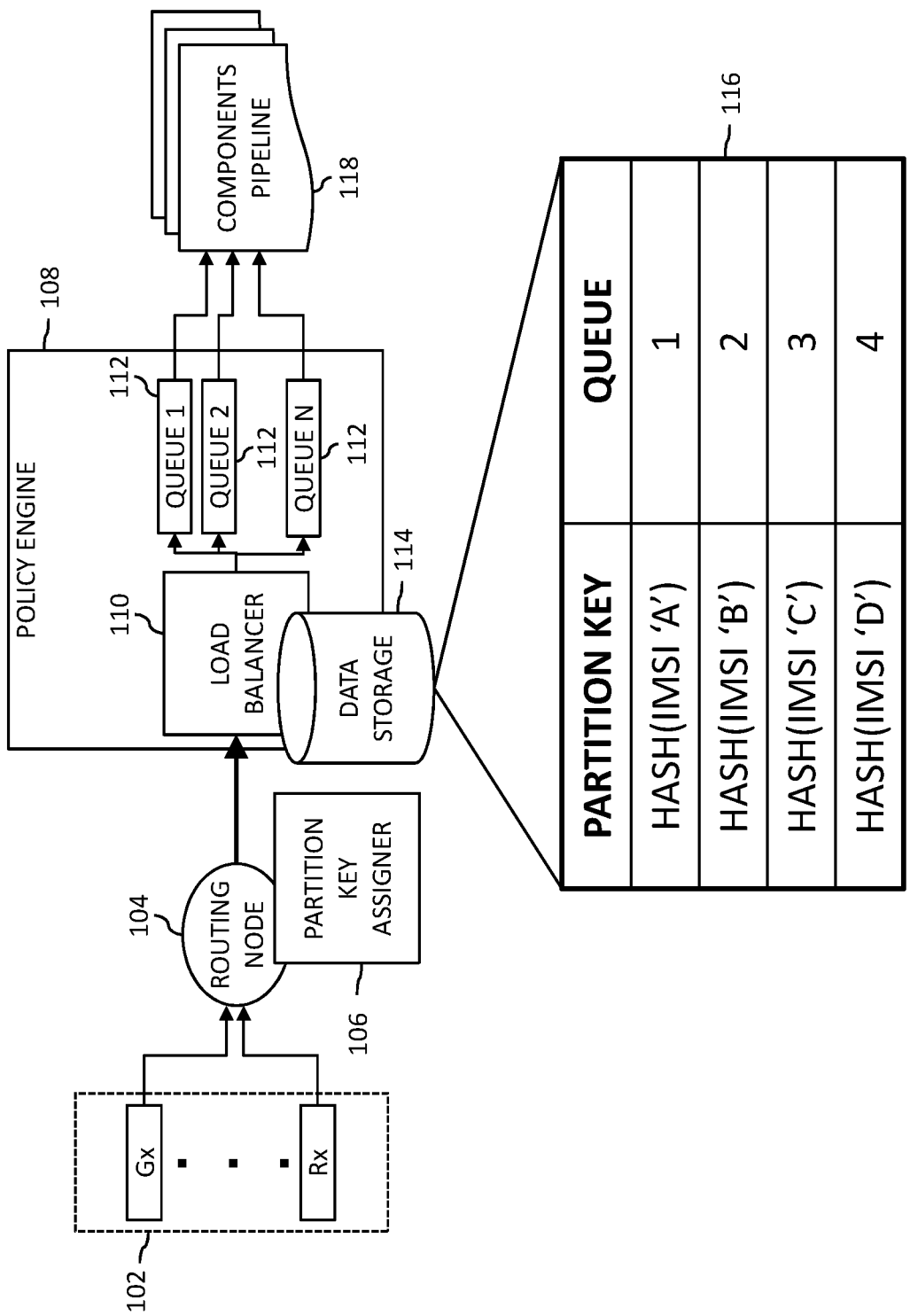
FIG. 1 is a diagram illustrating an example communications environment for lock-free communications processing at a network node.

The subject matter described herein relates to methods, systems, and computer readable media for lock-free communications processing at a network node. In telecommunications networks, a mobile subscriber may initiate or trigger multiple simultaneous or concurrent requests to a network node via various nodes (e.g., a Diameter routing agent (DRA), a policy and charging enforcement function (PCEF) server, an online charging function (OCF), an application server (AS), a mobility management entity (MME), a home subscriber server (HSS), a user data repository (UDR), etc.) and/or interfaces (e.g., Gx, Rx, Sh, S9, Sy, etc.). To prevent or mitigate race conditions or other message processing errors or issues (e.g., messages being processed out of order), various techniques or mechanisms may be utilized. One example technique to handle or mitigate race conditions involving simultaneous requests from the same mobile subscriber may include a subscriber identifier-based lock mechanism. In this example, the subscriber identifier-based lock mechanism may work at a component or hop-by-hop level instead of at an end-to-end level. That is, for each component of a component pipeline (e.g., a Diameter endpoint, a Diameter backend, a Diameter balancer, a database plugin component, a Diameter manager, a policy engine, and back to the Diameter manager) involved in handling a request, a lock may be obtained, a request or portion thereof may be processed by the component, and then the lock may be released. While a subscriber identifier-based lock mechanism or other lock-based mechanisms can be used to help mitigate race conditions, such mechanisms do not guarantee data consistency or ordered processing, e.g., when considering the interleaving of multiple components in different threads and associated requests may be processed concurrently. Moreover, lock-based mechanism generally increase memory (e.g., lock contention overhead) requirements and can also cause other issues (e.g., contentions, deadlocks, starvation, priority inversion, convoying, etc.) that can be difficult to diagnose and resolve.

In accordance with some aspects of the subject matter described herein, techniques, methods, systems, and/or mechanisms are disclosed for lock-free communications processing at a network node. For example, a network node in accordance with aspects described herein may be configured to add messages to a plurality of queues, wherein each of the plurality of queues is accessed by one of a plurality of threads (e.g., each queue may be accessed only by a single thread). In this example, the network node may also be configured (e.g., via appropriate programming) for: receiving a first message associated with a first mobile subscriber; determining that the first message is associated with a first partition key; assigning, based on the first partition key, the first message to a first queue of the plurality of queues, wherein the first queue includes messages associated with the first mobile subscriber and wherein the first queue is accessible by a first thread of the plurality of threads; and processing, by the first thread, messages of the first queue in a first in, first out (FIFO) order.

Advantageously, by using a lock-free communications processing technique and/or system, a network node (e.g., a signal transfer point) may effectively mitigate race conditions and/or other processing issues while also avoiding issues associated with lock-based system, e.g., deadlocks, starvation, and/or lock overhead memory requirements.

Reference will now be made in detail to various embodiments of the subject matter described herein, examples of which are illustrated in the accompanying drawings. Wherever possible, the same reference numbers will be used throughout the drawings to refer to the same or like parts.

FIG. 1 is a diagram illustrating an example communications environment 100 for lock-free communications processing at a network node. In some embodiments, communications environment 100 may include one or more nodes associated with an evolved packet core (EPC) network, a long-term evolution (LTE) network, an LTE-advanced network, a Diameter network, a fourth generation (4G) network, a third generation (3G) network, and/or another network.

Communications environment 100 may include a routing node (RN) 104, a policy engine (PE) 108, and multiple other network nodes, e.g., user equipment (UE), HSS(s), MME(s), PCEF(s), AS(s), etc. For example, various nodes in environment 100 can communicate using Diameter and/or other protocols. Diameter is an authentication, authorization, and accounting protocol for computer networks. Diameter applications extend the base protocol by adding new commands and/or attributes, e.g., commands and attributes for use with the extensible authentication protocol (EAP). A typical Diameter packet includes a Diameter header and a variable number of attribute-value pairs (AVPs) for encapsulating information relevant to the Diameter message.

RN 104 may represent any suitable entity or entities (e.g., software executing on at least one processor, one or more computing platforms, etc.) for receiving, processing, routing, and/or discarding messages, such as internet protocol (IP) messages, transmission control protocol (TCP) messages, Diameter messages, hypertext transfer protocol (HTTP) messages, and other messages. For example, RN 104 may include or represent a multi-protocol routing agent (MRA), an IP router, an IP switch, an LTE signaling router, a Diameter signaling router, a Diameter proxy, a Diameter agent, a Diameter routing agent, a Diameter relay agent, Diameter translation agent, or a Diameter redirect agent. RN 104 may include functionality for processing and/or routing various messages. In some embodiments, such functionality may be included in one or more modules (e.g., a session routing module).

RN 104 may include functionality for receiving, processing, and/or switching or routing various messages and may include various communications interfaces 102 for communicating with various nodes, e.g., 3rd Generation Partnership Project (3GPP) LTE communications interfaces and other (e.g., non-LTE) communications interfaces. Some example communications interfaces 102 for communicating with various nodes may include one or more of an IP interface, a TCP interface, a UDP interface, an HTTP interface, an RDP interface, an SCTP interface, an RTP interface, a Diameter interface, an LTE interface, and/or an IMS interface. Some example Diameter interfaces may include Gx, Rx, S9, Sd, Sx, Sy, and Sh.

In some embodiments, RN 104 may include hardware (e.g., processors and memory) along with software for performing functions described herein. Example processors of RN 104 may include at least one of a physical processor, a general-purpose microprocessor, a single-core processor, a multi-core processor, a field-programmable gate array (FPGA), and/or an application-specific integrated circuit (ASIC). In some embodiments, RN 104 and/or related processors may execute software stored in one or more non-transitory computer readable media, such as random-access memory (RAM) or a data storage device. For example, software may be loaded into a memory structure for execution by processors of RN 104. In this example, some processors or threads executing thereon may be configured to operate independently of other processor or threads executing thereon.

In some embodiments, RN 104 may include a partition key assigner (PKA) 106. PKA 106 may represent any suitable entity (e.g., software executing at one or more processors) for determining and/or assigning partition keys to messages and/or inserting partition keys in messages. For example, RN 104 may be configured via one or more instructions from a network operator to generate and insert a partition key in some or all messages that are to be routed or sent to a particular network node, e.g., PE 108. In this example, RN 104 may be configured to generate, using a hash algorithm and/or subscriber related information, a partition key for a message, where the partition key is a value usable (e.g., by PE 108 or a related entity) for determining how to assign the message to a message processing queue. Example subscriber related information usable in generating a partition key may include a session identifier, a sequence number, an E.164 number, an international mobile subscriber identity (IMSI) and/or a mobile station integrated services digital network (MSISDN) number.

In some embodiments, instead of a partition key being a hash value, a partition key may be one or more subscriber related identifiers with little to no modifications. In such embodiments, PE 108 or a related entity may have to perform additional steps as described below to identify an appropriate queue for message processing. For example, where a partition key does not easily map to a queue (e.g., where a partition key is not a hash output but an IMSI or other subscriber related identifier), PE 108 or a related entity may identify an appropriate queue by using a hash algorithm where the partition key is input, and where the hash algorithm is designed to output a value that uniquely identifies a queue at PE 108.

PE 108 may represent any suitable entity or entities (e.g., one or more computing platforms or devices) for generating and/or providing policy information to various nodes in environment 100. For example, PE 108 may be capable of receiving, processing, and responding to policy related messages. In some embodiments, PE 108 may include a multimedia policy engine (MPE) and/or a policy and charging rules function (PCRF). For example, PE 108 may be part of a 3GPP policy charging control (PCC) architecture. In this example, PCC elements may provide access, resource, and quality-of-service (QoS) control.

In some embodiments, PE 108 may include hardware (e.g., processors and memory) along with software for performing functions described herein. Example processors of PE 108 may include at least one of a physical processor, a general-purpose microprocessor, a single-core processor, a multi-core processor, an FPGA, and/or an ASIC. In some embodiments, RN 104 and/or related processors may execute software stored in one or more non-transitory computer readable media, such as data storage 114. For example, software may be loaded into a memory structure for execution by processors of PE 108. In this example, some processors or threads executing thereon may be configured to operate independently of other processor or threads executing thereon.

In some embodiments, PE 108 may include one or more processors that perform policy related actions. In some embodiments, PE 108 may be implemented in a distributed computing system or any appropriate system of one or more computers. For example, PE 108 may be implemented on a computing platform includes one or more processor blades, each implementing a PCRF or other function.

In operation, PE 108 may function in real-time or near real-time to determine policy rules in the mobile network. PE 108 may operate at the network core and access user information and other specialized functions in a centralized manner. PE 108 may aggregate information to and from the mobile network, operational supports systems, and other sources in real-time or near real-time, which can be useful for the creation of rules and automatically making policy decisions for each user active on the mobile network. Using PE 108, the mobile network may offer multiple services, QoS levels, and charging rules.

In some embodiments, PE 108 may provide the ability to manage both network and user policy in real-time or near real-time. For example, PE 108 may efficiently and dynamically route and prioritize network traffic. PE 108 may also provide a unified view of user context based on one or more of device, network, location, and billing data. For example, PE 108 can provide key inputs to revenue assurance and bandwidth management.

PE 108 may include a component(s) pipeline 118 or be communicatively coupled to component(s) pipeline 118. Component(s) pipeline 118 may represent any suitable entity or entities (e.g., one or more computing platforms or devices) for processing policy related requests or other messages and/or for performing related actions. In some embodiments, component(s) pipeline 118 may represent various modules or functions within PE 108 or communicatively coupled to PE 108. In some embodiments, component(s) pipeline 118 may represent nodes or functions that are external to PE 108. Component(s) pipeline 118 may include components that handle or process a Diameter message in a serial or chain-like fashion. For example, a thread may process a Diameter request by sending the Diameter message to a first component for processing, the first component may process the Diameter message before sending the Diameter message to a second component for processing, and so on and so forth. In this example, different messages may require different components of component(s) pipeline 118 and order of the components required may vary depending on the message being processed. Example components of component(s) pipeline 118 may include a Diameter endpoint, a Diameter backend, a Diameter balancer, a database plugin component, or a Diameter manager.

In some embodiments, PE 108 may include a load balancer 110, a plurality of queues 112 for message processing, and data storage 114. Load balancer 110 may represent any suitable entity (e.g., software executing at one or more processors) for distributing and/or assigning messages to one of the plurality of queues 112. For example, PE 108 or load balancer 110 may inspect messages (e.g., from RN 104) received at an input/output (I/O) layer (e.g., at a single, generic TCP or SCTP message queue) and may determine, based on a scheduling algorithm (e.g., a load balancing algorithm) and/or message data, how to distribute the messages to queues 112 for further processing. In this example, assuming Diameter messages are sent over TCP or SCTP packets, PE 108 or load balancer 110 may extract the Diameter messages from the received packets before assigning the Diameter messages to queues 112.

Data storage 114 may represent any suitable entity or entities for storing data associated with load balancing or scheduling message processing. In some embodiments, data storage 114 may include a data store 116 (e.g., a data table or other data structure) for storing associations between partition keys and assigned queues. For example, after assigning a message to a queue and if a corresponding partition key was not already in data store 116, PE 108 or load balancer 110 may update data store 116 to indicate that the partition key is associated with that queue. In this example, PE 108 or load balancer 110 can inspect data store 116 using a partition key from a received message as a lookup value to determine whether the received message is already associated with a queue. In some embodiments, data storage 114 may also include additional data and/or data stores for associating other message data, partition keys, and/or queues. For example, data storage 114 may include a data store 116 (e.g., a data table or other data structure) for storing associations between subscribed related identifiers and assigned queues and/or associations between subscribed related identifiers and assigned partition keys.

In some embodiments, PE 108 and/or another network node may be configured (e.g., via appropriate programming) for performing lock-free communications processing or related aspects thereof. For example, PE 108 may be configured to execute multiple threads for processing messages received via RN 104 and/or from various network nodes. In this example, each queue from among queues 112 may be assigned to a single thread, where related messages (e.g., messages associated with a particular subscriber) are added to the same queue. Continuing with this example, by having each thread process messages from its respective queue(s) in a FIFO order, related messages are processed in a serial order. As such, lock-free communications processing can be achieved that mitigates race conditions and/or other message processing issues (e.g., messages being processed out-of-order) without requiring a lock-based message processing technique at PE 108.

In some embodiments, an example lock-free communications processing technique may involve a plurality of threads N for processing messages and a plurality of queues M for storing or holding messages for processing, where M and N both represent integers, and M is higher than or equal to N. In some embodiments, each thread may be configured to access a same number of queues. For example, assuming M equals 10 and N equals five, each thread may be assigned to utilize two different queues. In some embodiments, threads may be configured to access a different number of queues. For example, assuming M equals 10 and N equals four, one thread may be assigned to utilize one queue and the other threads may be assigned three different queues each.

In some embodiments, one or more scheduling algorithms may be usable to assign messages to queues 112 for message processing at PE 108 or another network node. For example, a hybrid affinity-based and load balanced scheduling algorithm may be utilized to assign messages to queues 112 at PE 108. In this example, the scheduling algorithm may use one or more keys (e.g., partition keys, subscriber related identifiers and/or message data) to identify related messages (e.g., messages associated with a same mobile subscriber or messages that are part of the same session or flow). If a received message is associated with a queue (e.g., a partition key stored in the message is already assigned to a queue), then the received message will be assigned to the same queue. As such, the scheduling algorithm may exhibit a queue affinity for related messages. Continuing with the example, the scheduling algorithm may distribute, (e.g., load balance via one or more various algorithms, such as weighted round robin or weighted least load) messages that are not associated with a queue (e.g., Diameter session creation requests from mobile subscribers that are just logging in to a mobile network) among queues 112. By using the hybrid affinity-based and load balanced scheduling algorithm described above or a similar scheduling algorithm, related messages can be assigned to a same queue, while unrelated messages can be assigned (e.g., load balanced) across all queues 112, thereby allowing intra-queue, related messages to be processed sequentially in an expected order (e.g., FIFO order), while allowing inter-queue, non-related messages to be processed concurrently (e.g., in parallel).

In some embodiments, prior to being received by PE 108 or a related entity, messages may be processed by RN 104 or PKA 106 such that the messages include partition keys or other information for indicating an appropriate queue at PE 108 for message processing. For example, RN or PKA 106 may receive a Diameter request message associated with a mobile subscriber and may determine a partition key based on a subscriber related identifier (e.g., IMSI or E.164 number) in the Diameter request message. In this example, RN 104 or PKA 106 may add the partition key (e.g., in a header field or in an AVP) to the Diameter request message.

In some embodiments, configuring lock-free communications processing at PE 108 or another network node may involve providing configuration information to various nodes in environment 100. For example, configuration information related to lock-free communications processing may be provided in Diameter messages or other messages using one or more AVPs.

Tables 1-3 include example partition-key AVP data. Each table may include information about settings and/or keys that are relevant for different nodes or scopes (e.g., usage). Table 1 includes partition-key AVP data that may be relevant for common usage (e.g., not node specific). In particular, Table 1 provides key names, descriptions, and default values for the following keys: a 'Diameter.Partition.Enabled' key, a 'Diameter.Partition.Stateless' key, a 'Diameter.Partition.Applications' key, a 'Diameter.Partition.Commands' key, and a 'Diameter.Partition.Debug' key.

TABLE 1

Partition-Key AVP Data - Common Scope

| KEY NAME | DESCRIPTION | DEFAULT VALUE |
| --- | --- | --- |
| Diameter.Partition.Enabled | Boolean Flag to Indicate Whether Feature is Enabled or Disabled | False |
| Diameter.Partition.Stateless | Boolean Flag to Indicate Whether Partition-Key AVP is Present in All Messages | False |
| Diameter.Partition.Applications | Indicates Supported Diameter Applications | Gx, S9, Sd, Rx |
| Diameter.Partition.Commands | Indicates Supported Unsolicited Diameter Applications | 258, 274, 8388637 |
| Diameter.Partition.Debug | Indicates Whether to Trace Detailed Log Information | False |

Table 2 includes partition-key AVP data that may be relevant for routing node usage (e.g., by RN 104). In particular, Table 2 provides a key name, a description, and a default value for a 'Diameter.Partition.Enabled' key.

TABLE 2

Partition-Key AVP Data - Routing Node Scope

| KEY NAME | DESCRIPTION | DEFAULT VALUE |
| --- | --- | --- |
| Diameter.Partition.Enabled | Boolean Flag to Indicate Whether Feature is Enabled or Disabled | False |

Table 3 includes partition-key AVP data that may be relevant for policy engine usage (e.g., PE 108). In particular, Table 3 provides key names, descriptions, and default values for the following keys: a 'Diameter.Partition.Applications' key, a 'Diameter.Partition.KeyTag' key, and a 'Diameter.Partition.BufferImpr' key.

TABLE 3

Partition-Key AVP Data - Policy Engine Scope

| KEY NAME | DESCRIPTION | DEFAULT VALUE |
| --- | --- | --- |
| Diameter.Partition.Applications | Indicates Supported Diameter Applications | Gx, S9, Sd, Rx, Sy, Sh |

TABLE 3-continued

Partition-Key AVP Data - Policy Engine Scope

| KEY NAME | DESCRIPTION | DEFAULT VALUE |
|---|---|---|
| Diameter.Partition.KeyTag | Indicates Parameter/ Data for Partition Determination (e.g., None, Sequence Number, E.164 number, IMSI) | None |
| Diameter.Partition.BufferImpl | Buffer Implementation To use at Policy Engine (e.g., None, Consistent Hashing (CHASH)) | False |

It will be appreciated that FIG. 1 is for illustrative purposes and that various nodes and/or modules, locations, and/or functionality described above in relation to FIG. 1 may be changed, altered, added, or removed.

Figure 2:
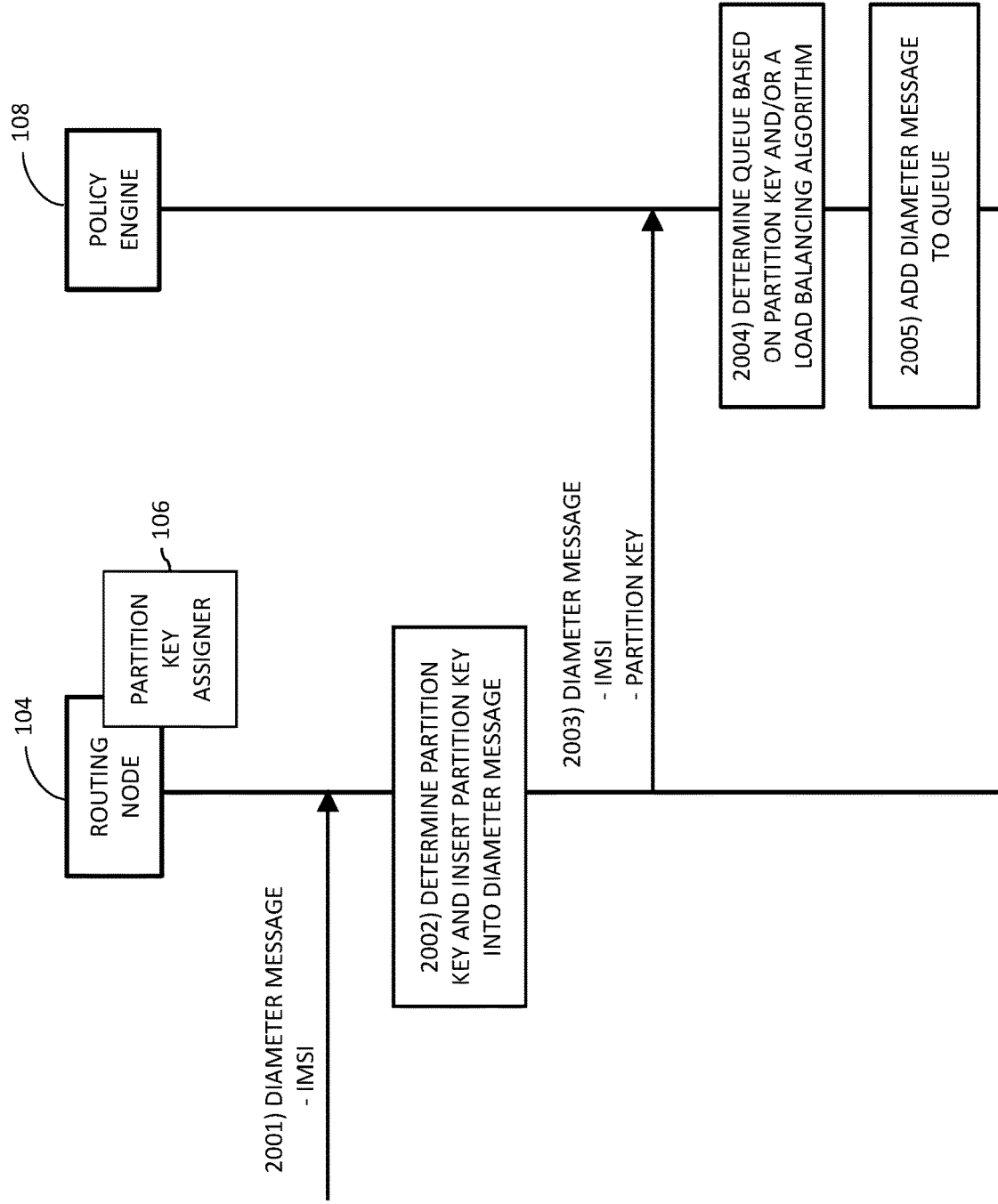
FIG. 2 is a diagram illustrating example lock-free communications processing involving a routing node.

FIG. 2 is a diagram illustrating example lock-free communications processing involving RN 104. In some embodiments, PE 108 may receive Diameter messages that have partition keys or related AVPs associated with a lock-free communications processing technique or system and may assign the Diameter messages to queues based on these partition keys or related AVPs. In such embodiments, the partition key or related AVPs may be inserted into the Diameter messages by RN 104 or a related entity (e.g., PKA 106) prior to the Diameter messages being received by PE 108.

Referring to FIG. 2, RN 104 may be capable of receiving Diameter messages from a plurality of nodes and via various communications interfaces 102. In some embodiments, RN 104 or PKA 106 may be configured to inspect received Diameter messages for various information (e.g., an IMSI, an E.164 number, a sequence number, etc.) and may use this information in tagging or marking the Diameter messages with a partition key (e.g., by inserting a related AVP in the Diameter messages before sending the Diameter messages onward to PE 108. In such embodiments, PE 108 may use the partition keys and/or a load balancing algorithm to determine which queues to assign the Diameter messages.

In step 2001, a Diameter message containing an IMSI or other subscriber related identifier (e.g., an E.164 number) may be received by RN 104. For example, a Diameter message may be received from an MME, an HSS, a PCEF, or another node.

In step 2002, RN 104 may determine a partition key associated with a subscriber related identifier and insert the partition key in the Diameter message or may mark the Diameter message such that PE 108 can determine the appropriate queue to receive the Diameter message. For example, RN 104 or a related entity (e.g., PKA 106) may be configured by a network operator or other entity to use a particular subscriber related identifier stored in a Diameter message as a basis for a partition key. In this example, RN 104 or a related entity may determine the partition key using the subscriber related identifier in the Diameter message. Continuing with this example, the partition key may be determined by a hash algorithm such that the Diameter messages containing a same subscriber related identifier are always assigned the same queue among a plurality of queues used for message processing.

In step 2003, RN 104 may send the Diameter message containing the partition key to PE 108 for processing.

In step 2004, PE 108 may receive the Diameter message and may determine an appropriate queue for the Diameter message based on the partition key and/or a load balancing algorithm. For example, PE 108 may attempt to determine whether a previous Diameter message associated with the partition key was assigned a queue by querying data store 116. In this example, if the partition key is already assigned to a queue, PE 108 may add the Diameter message to the queue. Continuing with this example, if the partition key is not already assigned to a queue, PE 108 may use a load balancing algorithm (e.g., a weighted round robin approach, a random approach, a least connections approach, etc.) to select a queue for the Diameter message and may add this queue assignment to data store 116 for subsequent usage.

In step 2005, PE 108 may add the Diameter message to the queue determined in step 2004.

In some embodiments, a thread associated with a processor of PE 108 may process messages in the queue in a FIFO order or some other order (e.g., a priority-based order).

It will be appreciated that FIG. 2 is for illustrative purposes and that different and/or additional messages, nodes, and/or actions may be used. It will also be appreciated that various messages and/or actions described herein may occur in a different order or sequence. For example, in embodiments where PE 108 performs PKA functionality, PE 108 or a related entity may receive a Diameter message that lacks a partition key and may determine a partition key and/or an appropriate queue for processing using an IMSI or other message data after reception.

Figure 3:
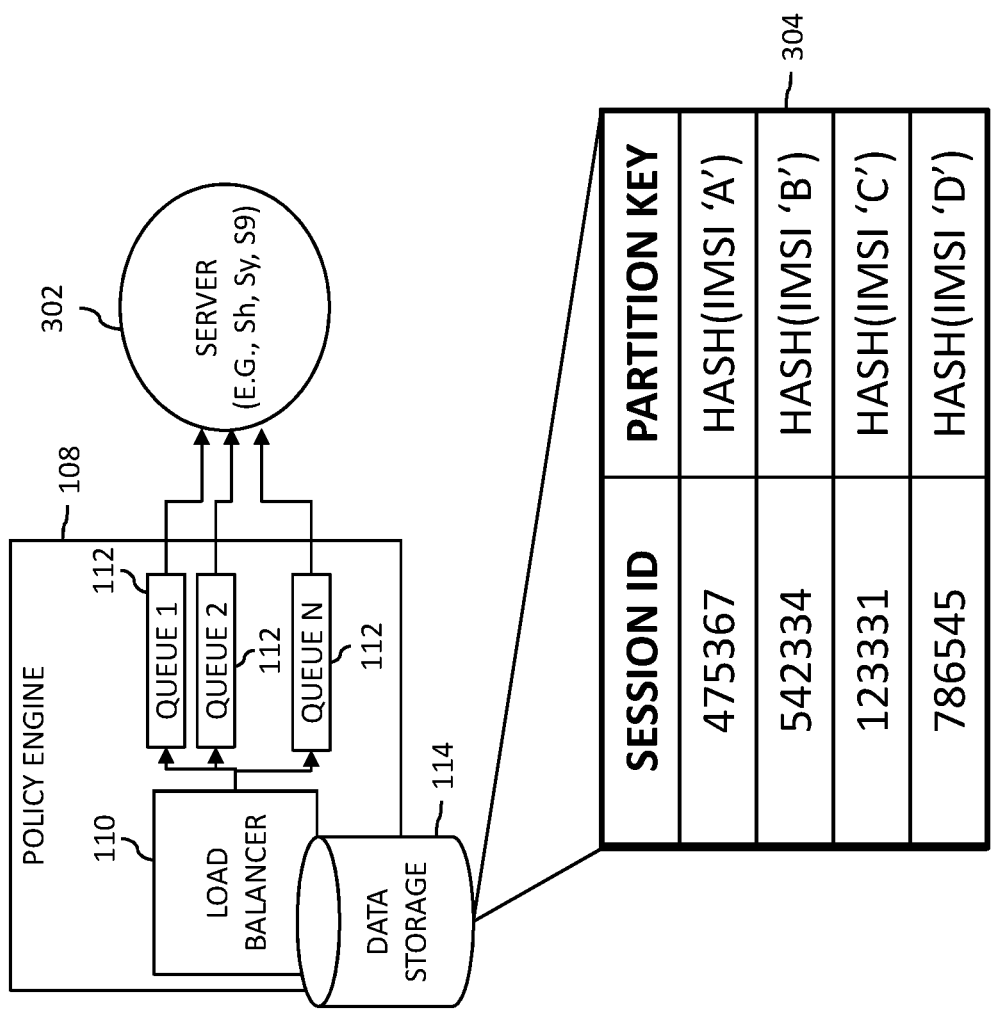
FIG. 3 is a diagram illustrating an example communications environment for lock-free communications processing involving session identifiers.

FIG. 3 is a diagram illustrating an example communications environment 300 for lock-free communications processing involving session identifiers. In some embodiments, communications environment 300 may be similar to communications environment 100 and may include PE 108, RN 104, and/or other network nodes described above. For example, communications environment 300 may include one or more nodes associated with an EPC network, an LTE network, an LTE-advanced network, a Diameter network, a 4G network, a 3G network, and/or another network.

Communications environment 300 may include a server 302. Server 302 may represent any suitable entity or entities (e.g., software executing on at least one processor, one or more computing platforms, etc.) capable of communicating with PE 108 via RN 104 or directly (e.g., without traversing RN 104). For example, server 302 may be an application server, a user data repository (UDR), or an online charging system (OCS). In some embodiments, communications between PE 108 and server 302 may utilize one or more Diameter interfaces (e.g., Gx, Rx, S9, Sd, Sx, Sy, or Sh) and/or other interfaces.

In some embodiments, PE 108 may communicate with server 302 by receiving and/or sending Diameter messages or other messages that lack partition keys and/or that lack an IMSI or E.164 number. In such embodiments, PE 108 or a related entity (e.g., load balancer 110) may utilize a data store 304 containing associations between session identifiers and partition keys. For example, PE 108 may receive or generate a message that does not have a partition key or related partition key tag (e.g., IMSI). In this example, PE 108 or a related entity may identify a partition key related to the message by querying data store 304 using a session identifier associated with the message. If a partition key associated with the session identifier is found, PE 108 or a related entity may add the message to a queue corresponding to the partition key. If a partition key associated with the session identifier is not found, PE 108 or a related entity may add the message to a queue as determined by a load balancing algorithm, e.g., a least utilized algorithm or a round robin algorithm.

It will be appreciated that FIG. 3 is for illustrative purposes and that various nodes and/or modules, locations, and/or functionality described above in relation to FIG. 3 may be changed, altered, added, or removed.

Figure 4:
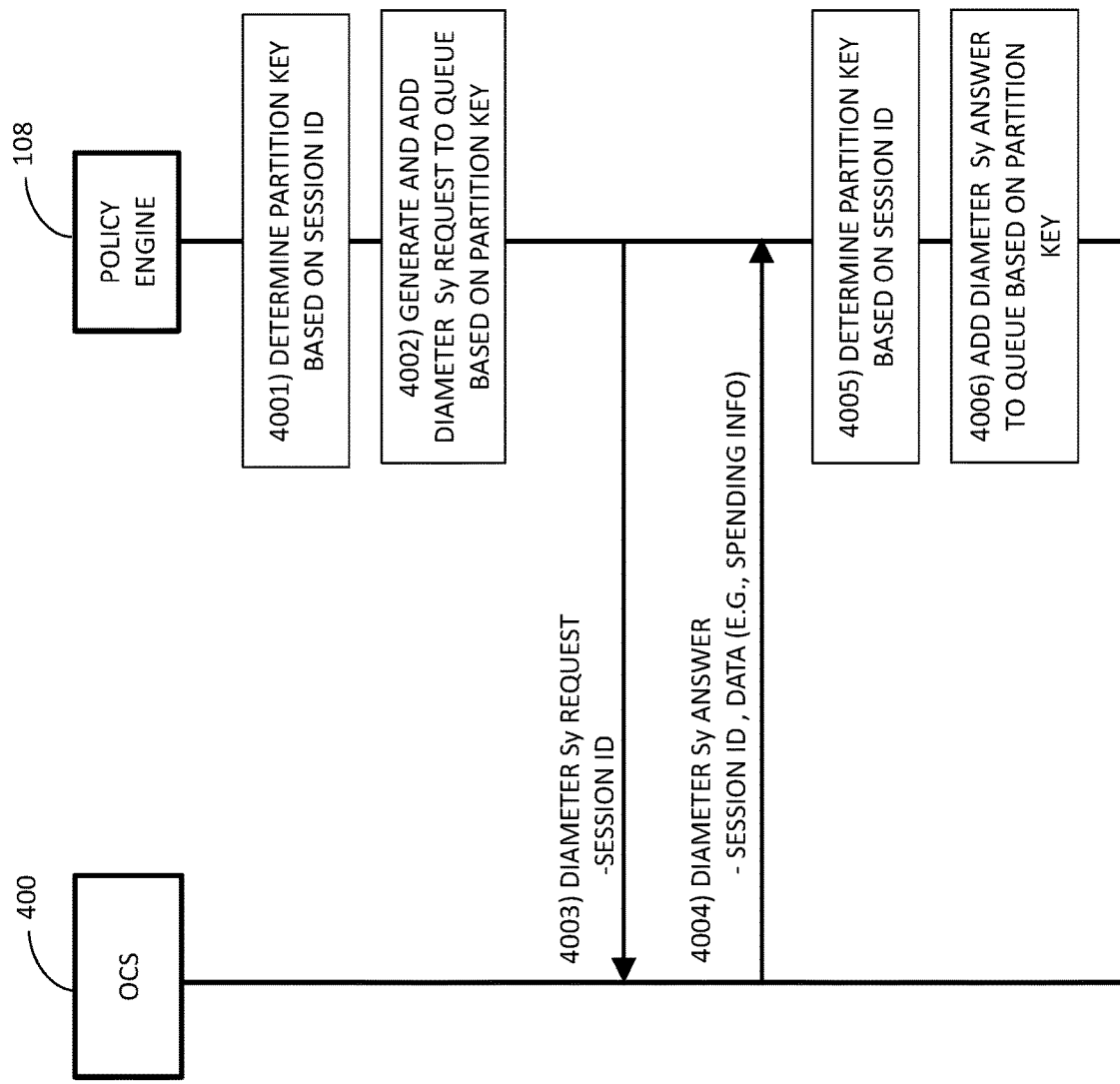
FIG. 4 is a diagram illustrating example lock-free communications processing at a policy engine.

FIG. 4 is a diagram illustrating example lock-free communications processing at PE 108. In some embodiments, PE 108 may originate and/or send Diameter messages that do not have partition keys or a related AVP associated with a lock-free communications processing technique or system. In such embodiments, PE 108 or a related entity may be configured for determining whether other message related data (e.g., a session identifier) can indicate an appropriate queue to use.

Referring to FIG. 4, PE 108 may communicate with an OCS 400 via a Diameter Sy interface and/or other interfaces. OCS 400 may represent any suitable entity for monitoring policy usage and/or related charging information. For example, OCS 400 may maintain policy counters for indicating how much spending or credit is left for a user or related device. In this example, PE 108 or another entity may send a Diameter request (e.g., a Spending-Limit-Request (SLR) message or a Spending-Status-Notification-Request (SNR) message) to OCS 400. Continuing with this example, OCS 400 may respond with a Diameter message (e.g., a Spending-Limit-Answer (SLA) message or a Spending-Status-Notification-Answer (SNR) message) indicating the requested spending information.

In step 4001, PE 108 may determine a partition key associated with a session identifier. For example, PE 108 or a related entity may access data store 304 and identify a partition key based on a session identifier. In this example, the session identifier may be related to a flow for which PE 108 is going to query OCS 400 for charging information.

In step 4002, PE 108 may generate a Diameter Sy request (e.g., a Diameter SNR message) associated with the session identifier and may add the Diameter Sy request to the queue that corresponds to the partition key determined in step 4001.

In step 4003, PE 108 may send the Diameter Sy request to OCS 400 for processing.

In step 4004, OCS 400 may generate and send a Diameter Sy answer (e.g., a Diameter SNA message) to PE 108, e.g., directly or via RN 104.

In step 4005, PE 108 may determine a partition key associated with a session identifier in the Diameter Sy answer.

In step 4006, PE 108 may add the Diameter Sy answer to the queue that corresponds to the partition key determined in step 4005.

In some embodiments, a thread associated with a processor of PE 108 may process messages in the queue of step 4006 in a FIFO order or some other order.

In some embodiments, PE 108 may include a partition key (e.g., within a related AVP) in a Diameter Sy request and OCS 400 may be configured to include the partition key in a Diameter Sy answer. In such embodiments, PE 108 or a related entity may inspect the messages to determine the partition key and corresponding queue to use, e.g., in lieu of using a session identifier to query data store 304.

It will be appreciated that FIG. 4 is for illustrative purposes and that different and/or additional messages, nodes, and/or actions may be used. It will also be appreciated that various messages and/or actions described herein may occur in a different order or sequence. For example, similar data store lookups involving session identifiers may be performed when communicating with other nodes, e.g., an HSS, an application server, and/or a UDR.

Figure 5:
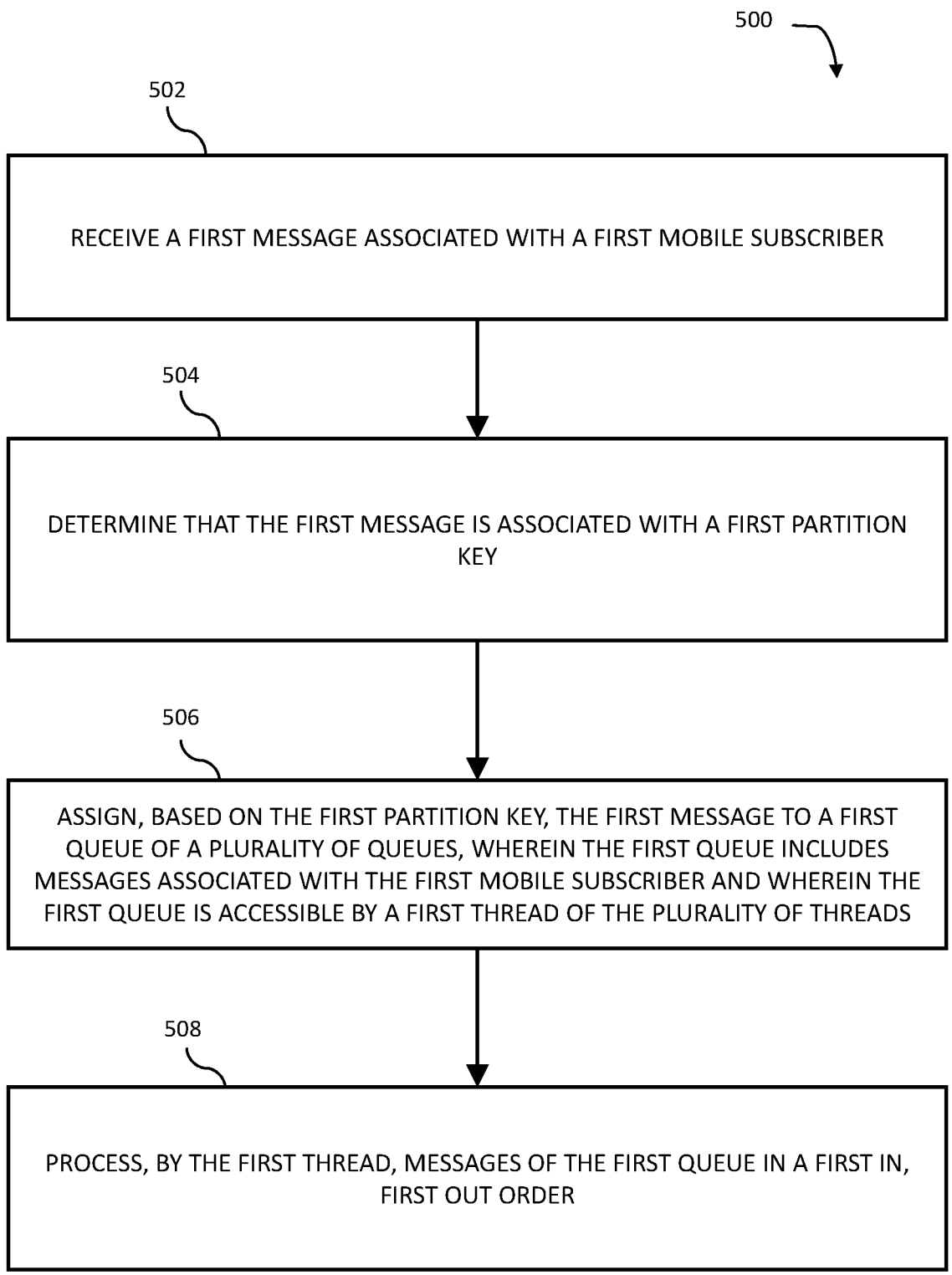
FIG. 5 is a diagram illustrating an example process for lock-free communications processing at a network node.

FIG. 5 is a diagram illustrating an example process 500 for lock-free communications processing at a network node. In some embodiments, example process 500 described herein, or portions thereof, may be performed at or performed by PE 108, RN 104, and/or one or more modules or nodes.

Referring to example process 500, in step 502, a first message associated with a first mobile subscriber may be received. For example, a Diameter credit control request (CCR) message may be sent from a PCEF to PE 108 via RN 104. In this example, the Diameter CCR message may include an IMSI associated with a particular subscriber.

In step 504, it may be determined that the first message is associated with a first partition key. For example, PE 108 or related entity may inspect a Diameter message for a Partition AVP containing a partition key indicating which one of a plurality of queues the message should be assigned.

In some embodiments, determining that a first message is associated with a partition key may include querying, using a session identifier as a lookup value, a data structure (e.g., data store 304) containing associations between session identifiers and partition keys. For example, where a message is generated or received that does not have a partition key or related tag (e.g., IMSI), PE 108 or a related entity may query data store 304 to determine whether the session identifier is associated with a partition key. In this example, if the session identifier is associated with a partition key, PE 108 or a related entity may assign and/or add the message to a queue corresponding to the partition key. Continuing with this example, if the session identifier is not associated with a partition key, PE 108 or a related entity may assign and/or add the message in a queue as determined by a load balancing algorithm, e.g., a least utilized algorithm or a round robin algorithm.

In some embodiments, a first message may include a Diameter message, a Diameter Gx message, a Diameter S9 message, a Diameter Sh message, a Diameter Sx message, a Diameter Sy message, a Diameter Rx message, a Diameter CCR message, or a Diameter re-auth-request (RAR) message.

In step 506, the first message may be assigned, based on the first partition key, to a first queue of a plurality of queues, wherein the first queue includes messages associated with the first mobile subscriber and wherein the first queue is accessible by a first thread of a plurality of threads. For example, at an input/output level, PE 108 may receive a message containing a partition key associated with a first queue and, as such, PE 108 may assign and add the message to the first queue, where the message can be processed in a FIFO manner.

In step 508, messages of the first queue may be processed, by the first thread, in a FIFO order. For example, a thread may be executing on a processor of PE 108. In this example, the thread may be configured to access one queue of a plurality of queues to obtain messages for processing, where the thread processing messages from the queue in a FIFO manner.

In some embodiments, after, before, or concurrently with processing messages of a first queue by a first thread, a network node (e.g., PE 108) may be configured for: receiving a second message associated with a second mobile subscriber; determining that the second message is not associated with a partition key or a corresponding queue; assigning, using a load balancing algorithm, the second message to a second queue of a plurality of queues, wherein the second queue may be accessible by a second thread of a plurality of threads; and processing, by the second thread, messages of the second queue in a FIFO order.

In some embodiments, the first partition key may be determined using a subscriber related identifier stored in the first message. For example, a subscriber related identifier may include a session identifier, a sequence number, an E.164 number, an IMSI, or an MSISDN.

In some embodiments, the first partition key may be stored in the first message by a second network node prior to the first message being received by the first network node. In some embodiments, a first network node may include a PCRF, a MPE, or PE 108. In some embodiments, a second network node may include RN 104, e.g., a MRA and/or a DRA. For example, RN 104 may determine a partition key for a message and may insert the partition key in a header portion in the message before routing or forwarding the message to PE 108.

It will be appreciated that while some aspects of the subject matter described herein has been discussed with reference to Diameter related network nodes (e.g., RN 104 and PE 108), various other network nodes may utilize some aspects of the subject matter described herein. For example, any network node that receives multiple messages from users or subscribers may use features, mechanisms, and/or techniques described herein to perform lock-free communications processing.

It should be noted that PE 108, RN 104, and/or functionality described herein may constitute a special purpose computing device, e.g., a telecommunications network node. Further, PE 108, RN 104, and/or functionality described herein can improve the technological field of communications processing. For example, by using a lock-free communications processing technique and/or system, a network node (e.g., a signal transfer point) may effectively mitigate race conditions and/or other processing issues while also avoiding issues associated with lock-based system, e.g., deadlocks, starvation, and/or lock overhead memory requirements.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for lock-free communications processing at a network node, the method comprising:
  at a first network node for performing lock-free communications processing and configured to add messages to a plurality of queues, wherein each of the plurality of queues is accessed by one of a plurality of threads:
  receiving a first message associated with a first mobile subscriber;
  determining that the first message is associated with a first partition key, wherein the first partition key is determined using a subscriber related identifier and wherein the first partition key is inserted in the first message by a second network node prior to the first message being received by the first network node;
  assigning, based on the first partition key, the first message to a first queue of the plurality of queues, wherein the first queue includes messages associated with the first mobile subscriber and wherein the first queue is accessible by a first thread of the plurality of threads; and
  processing, using the first thread, messages of the first queue in a first in, first out order, wherein the processing includes processing the first message of the first queue in a serial manner using a plurality of downstream nodes.

2. The method of claim 1 comprising:
  receiving a second message associated with a second mobile subscriber;
  determining that the second message is not associated with a partition key or a corresponding queue;
  assigning, using a load balancing algorithm, the second message to a second queue of the plurality of queues, wherein the second queue is accessible by a second thread of the plurality of threads; and
  processing, by the second thread, messages of the second queue in a first in, first out order.

3. The method of claim 1 wherein determining that the second message is not associated with a partition key includes querying, using a session identifier as a lookup value, a data structure containing associations between session identifiers and related partition keys.

4. The method of claim 1 wherein the first message includes a Diameter message, a Diameter Gx message, a Diameter S9 message, a Diameter Sh message, a Diameter Sx message, a Diameter Sy message, a Diameter Rx message, a Diameter credit control request message, or a Diameter re-auth-request message.

5. The method of claim 1 wherein the subscriber related identifier is in the first message.

6. The method of claim 1 wherein the subscriber related identifier includes a session identifier, a sequence number, an E.164 number, an international mobile subscriber identity (IMSI) or a mobile station integrated services digital network (MSISDN) number.

7. The method of claim 1 wherein the second network node includes a multi-protocol routing agent or a Diameter routing agent.

8. The method of claim 1 wherein the first network node includes a policy and charging rules function, a multimedia policy engine, or a policy engine.

9. A system for lock-free communications processing at a network node, the system comprising:
  a first network node for performing lock-free communications processing and comprising: at least one processor; and a memory,
  wherein the first network node is configured to add messages to a plurality of queues, wherein each of the plurality of queues is accessed by one of a plurality of threads, wherein the first network node is further configured for:
  receiving a first message associated with a first mobile subscriber;
  determining that the first message is associated with a first partition key, wherein the first partition key is determined using a subscriber related identifier and wherein the first partition key is inserted in the first message by a second network node prior to the first message being received by the first network node;
  assigning, based on the first partition key, the first message to a first queue of the plurality of queues, wherein the first queue includes messages associated with the first mobile subscriber and wherein the first queue is accessible by a first thread of the plurality of threads; and
  processing, using the first thread, messages of the first queue in a first in, first out order, wherein the processing includes processing the first message of the first queue in a serial manner using a plurality of downstream nodes.

10. The system of claim 9 wherein the first network node is further configured for:
receiving a second message associated with a second mobile subscriber;
determining that the second message is not associated with a partition key or a corresponding queue;
assigning, using a load balancing algorithm, the second message to a second queue of the plurality of queues, wherein the second queue is accessible by a second thread of the plurality of threads; and
processing, by the second thread, messages of the second queue in a first in, first out order.

11. The system of claim 9 wherein the first network node is further configured for querying, using a session identifier as a lookup value, a data structure containing associations between session identifiers and related partition keys.

12. The system of claim 9 wherein the first message includes a Diameter message, a Diameter Gx message, a Diameter S9 message, a Diameter Sh message, a Diameter Sx message, a Diameter Sy message, a Diameter Rx message, a Diameter credit control request message, or a Diameter re-auth-request message.

13. The system of claim 9 wherein the subscriber related identifier is in the first message.

14. The system of claim 9 wherein the subscriber related identifier includes a session identifier, a sequence number, an E.164 number, an international mobile subscriber identity (IMSI) or a mobile station integrated services digital network (MSISDN) number.

15. The system of claim 9 wherein the second network node includes a multi-protocol routing agent or a Diameter routing agent.

16. The system of claim 9 wherein the first network node includes a policy and charging rules function, a multimedia policy engine, or a policy engine.

17. A non-transitory computer readable medium comprising computer executable instructions embodied in the non-transitory computer readable medium that when executed by at least one processor of a first network node cause the first network node to perform steps comprising:
at the first network node for performing lock-free communications processing and configured to add messages to a plurality of queues, wherein each of the plurality of queues is accessed by one of a plurality of threads:
receiving a first message associated with a first mobile subscriber;
determining that the first message is associated with a first partition key, wherein the first partition key is determined using a subscriber related identifier and wherein the first partition key is inserted in the first message by a second network node prior to the first message being received by the first network node;
assigning, based on the first partition key, the first message to a first queue of the plurality of queues, wherein the first queue includes messages associated with the first mobile subscriber and wherein the first queue is accessible by a first thread of the plurality of threads; and
processing, using the first thread, messages of the first queue in a first in, first out order, wherein the processing includes processing the first message of the first queue in a serial manner using a plurality of downstream nodes.

18. The non-transitory computer readable medium of claim 17 wherein determining that the second message is not associated with a partition key includes querying, using a session identifier as a lookup value, a data structure containing associations between session identifiers and related partition keys.

* * * * *